(12) United States Patent
Mori et al.

(10) Patent No.: US 10,982,974 B2
(45) Date of Patent: Apr. 20, 2021

(54) MAGNET, MAGNET STRUCTURE, AND ROTATIONAL ANGLE DETECTOR

(71) Applicant: TDK Corporation, Tokyo (JP)

(72) Inventors: Naoki Mori, Tokyo (JP); Hiroshi Ito, Tokyo (JP); Yoshiaki Okada, Tokyo (JP)

(73) Assignee: TDK Corporation, Tokyo (JP)

(*) Notice: Subject to any disclaimer, the term of this patent is extended or adjusted under 35 U.S.C. 154(b) by 375 days.

(21) Appl. No.: 15/944,943

(22) Filed: Apr. 4, 2018

(65) Prior Publication Data

US 2018/0299296 A1    Oct. 18, 2018

(30) Foreign Application Priority Data

Apr. 18, 2017    (JP) .............................. JP2017-082240

(51) Int. Cl.

| G01D 5/16 | (2006.01) |
|---|---|
| H01F 7/02 | (2006.01) |
| H01F 1/057 | (2006.01) |
| G01D 5/14 | (2006.01) |
| H02K 11/215 | (2016.01) |
| B62D 15/02 | (2006.01) |

(52) U.S. Cl.
CPC .............. *G01D 5/16* (2013.01); *H01F 1/057* (2013.01); *H01F 7/02* (2013.01); *H01F 7/0257* (2013.01); *B62D 15/0215* (2013.01); *G01D 5/145* (2013.01); *H01F 1/0578* (2013.01); *H02K 11/215* (2016.01)

(58) Field of Classification Search
CPC .. G01D 5/16; G01D 5/145; H01F 7/02; H01F 7/0257; H01F 7/0294; H02K 11/215; B62D 15/0215
See application file for complete search history.

(56) References Cited

U.S. PATENT DOCUMENTS

| 4,902,361 A | 2/1990 | Lee et al. | |
|---|---|---|---|
| 5,055,781 A * | 10/1991 | Sakakibara | G01B 7/30 257/E43.004 |
| 5,464,670 A | 11/1995 | Ikuma et al. | |
| 5,643,491 A | 7/1997 | Honkura et al. | |
| 5,733,580 A | 3/1998 | Ikuma et al. | |
| 2005/0067058 A1* | 3/2005 | Fujimori | C22C 38/005 148/302 |
| 2005/0068024 A1* | 3/2005 | Byram | G01D 5/145 324/207.25 |
| 2011/0025309 A1 | 2/2011 | Saruki et al. | |
| 2012/0146630 A1 | 6/2012 | Itomi | |

(Continued)

FOREIGN PATENT DOCUMENTS

| CN | 1056369 A | 11/1991 |
|---|---|---|
| CN | 1056370 A | 11/1991 |

(Continued)

*Primary Examiner* — Son T Le
*Assistant Examiner* — Dustin R Dickinson
(74) *Attorney, Agent, or Firm* — Faegre Drinker Biddle & Reath LLP

(57) ABSTRACT

A magnet has a circular cylinder or circular tube shape and contains magnetic crystal grains, wherein an orientation of magnetization of the magnet is in a direction perpendicular to an axis of the circular cylinder or the circular tube, and directions of axes of easy magnetization of the magnetic crystal grains are isotropic.

5 Claims, 12 Drawing Sheets

(56) References Cited

U.S. PATENT DOCUMENTS

| | | |
|---|---|---|
| 2012/0176126 A1 | 7/2012 | Naganuma et al. |
| 2015/0008907 A1 | 1/2015 | Janisch |
| 2015/0204696 A1 | 7/2015 | Hirota et al. |
| 2016/0314887 A1 | 10/2016 | Miyazaki et al. |
| 2018/0040405 A1 | 2/2018 | Miyazaki et al. |

FOREIGN PATENT DOCUMENTS

| | | |
|---|---|---|
| CN | 1094843 A | 11/1994 |
| CN | 105814651 A | 7/2016 |
| CN | 107221402 A | 9/2017 |
| CN | 107437447 A | 12/2017 |
| JP | 2011-058870 A | 3/2011 |
| JP | 4947321 B2 | 6/2012 |
| JP | 5141780 B2 | 2/2013 |
| JP | 2015-508899 A | 3/2015 |
| JP | 2015-135312 A | 7/2015 |
| JP | 2016-153765 A | 8/2016 |
| JP | 2016-153766 A | 8/2016 |
| WO | WO 2008/056756 A1 | 5/2008 |

* cited by examiner

US 10,982,974 B2

MAGNET, MAGNET STRUCTURE, AND ROTATIONAL ANGLE DETECTOR

TECHNICAL FIELD

The present invention relates to a magnet, a magnet structure, and a rotational angle detector.

BACKGROUND

Recently, magnetic rotational angle detectors are widely used for various purposes such as detection of a rotational position in steering of a vehicle. As the magnetic rotational angle detectors, for example, there are known rotational angle detectors disclosed in Patent Literatures 1 and 2.

The aforementioned rotational angle detectors include a magnet provided on a rotary shaft, and a magnetic sensor which detects a magnetic field from the magnet, and detect a rotational angle of the magnet on the basis of a detection output from the magnetic sensor.

Patent Literature 1: Japanese Patent No. 4947321
Patent Literature 2: Japanese Patent No. 5141780

SUMMARY

However, there have been cases where a conventional magnet cannot detect the angle with sufficient accuracy.

An object of the present invention is to provide a magnet, a magnet structure, and a rotational angle detector which enable highly accurate detection of a rotational angle.

There is provided a magnet according to the present invention, having a circular cylinder or circular tube shape and containing many magnetic crystal grains, wherein an orientation of magnetization of the magnet is in a direction perpendicular to an axis of the circular cylinder or the circular tube, and directions of axes of easy magnetization of the magnetic crystal grains are isotropic.

With the magnet according to the present invention, when rotating the magnet around the axis, an orientation of a magnetic field rotates around the axis and changes on the axis in response to a rotational angle of the magnet. Further, since the magnet has the circular cylinder shape and the orientation of magnetization is in the direction perpendicular to the axis of the circular cylinder, even when a position of a magnetic sensor is little displaced from the axis, the magnitude and the orientation of the magnetic field supplied to the magnetic sensor do not change very much as compared with the case of being on the axis. Accordingly, even when a little error arises on an attachment position of the magnetic sensor in a direction going apart from the axis, highly accurate angle measurement is possible.

Furthermore, since the directions of the axes of easy magnetization of the magnetic crystal grains in the magnet are isotropic, and hence, the direction of magnetization in the magnet is easier to be controlled as compared with a magnet in which directions of axes of easy magnetization are anisotropic, accuracy of angle detection can be more enhanced.

Here, the aforementioned magnet can further contain a resin.

Moreover, in the aforementioned magnet, one plane perpendicular to the axis can have a region having a magnetic flux density around a point of intersection of the axis, the magnetic flux density falling within a range of ±2% relative to a magnetic flux density at the point of intersection of the axis, and a radius of an inscribed circle of the region can be 0.5 mm or more.

Such a magnet can easily maintain high accuracy even when the position of the magnetic sensor is displaced on the plane.

Moreover, in the aforementioned magnet, one plane perpendicular to the axis can have a region having an orientation of an in-plane magnetic field around a point of intersection of the axis, an inclination of the orientation falling within a range of ±0.6° relative to an orientation of an in-plane magnetic field at the point of intersection of the axis, and a radius of an inscribed circle of the region can be 0.5 mm or more.

Moreover, the magnetic crystal grains can contain a rare earth element, a transition element, and boron.

A magnet structure according to the present invention includes: the aforementioned magnet; and a magnet retainer retaining the magnet.

A rotational angle detector according to the present invention includes: the aforementioned magnet structure; and a magnetic sensor detecting an orientation of a magnetic field.

According to the present invention, a magnet, a magnet structure, and a rotational angle detector which enable highly accurate detection of a rotational angle are provided.

DETAILED DESCRIPTION

Magnets and magnet structure bodies according to embodiments of the present invention are described with reference to the drawings.

First Embodiment

Figure 1:
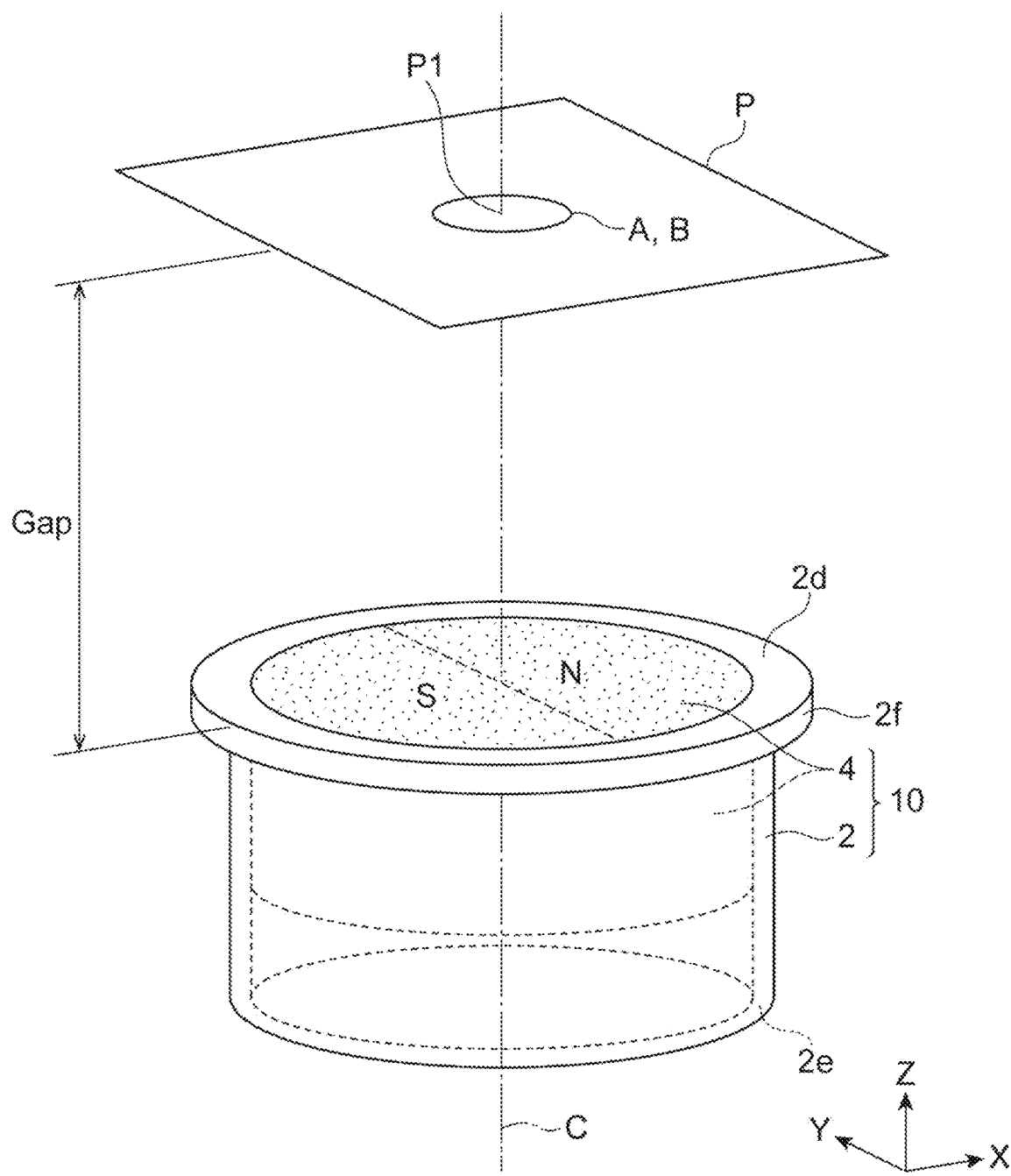
FIG. 1 is a perspective view of a magnet structure according to a first embodiment.
Figure 2:
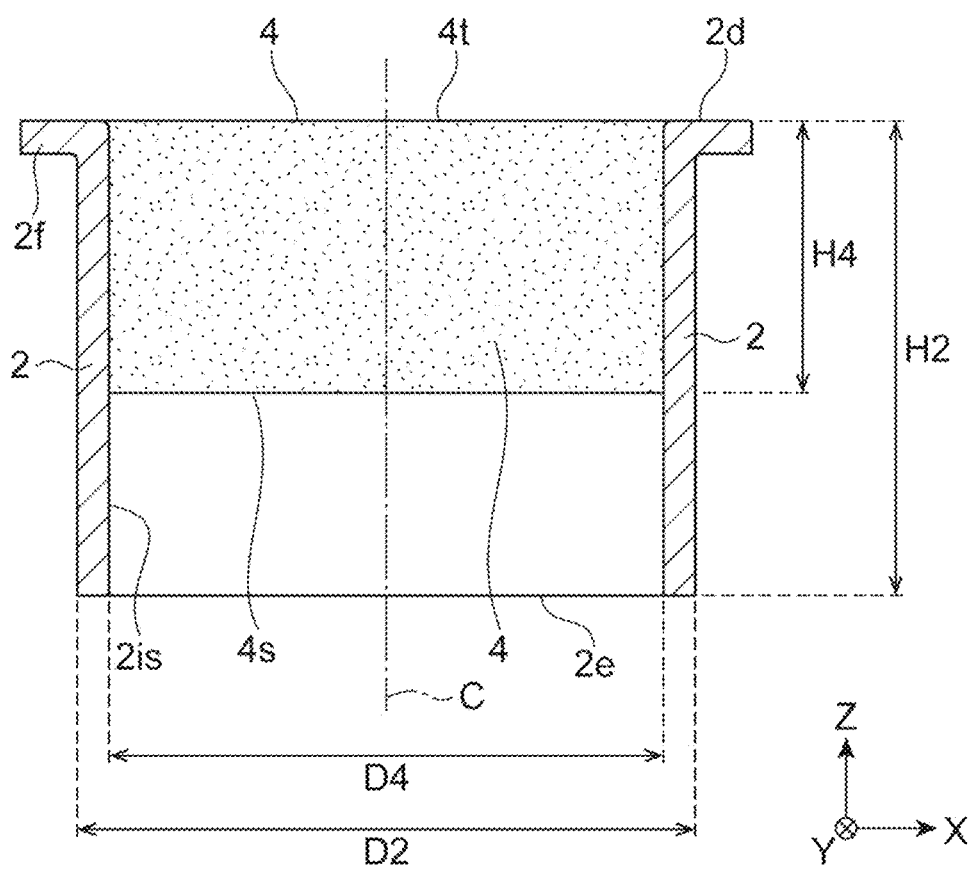
FIG. 2 is a cross-sectional view along an axis C in FIG. 1.

FIG. 1 is a perspective view of a magnet structure 10 having a magnet 4 according to a first embodiment of the present invention. The magnet structure 10 of the present embodiment includes the magnet 4 and a tube-shaped magnet retainer 2. FIG. 2 is a cross-sectional view including the magnet 4 according to the first embodiment and an axis C which is a center axis of the magnet retainer 2.

The magnet 4 has a circular cylinder shape, and has an upper face (end face) 4t and a lower face 4s which are perpendicular to the axis C.

In view of enhancing accuracy of a sensor, the distance between the upper face 4t and the lower face 4s in the magnet 4 (that is, a thickness H4 of the magnet 4) can be, for example, 1 mm or more, or 2 mm or more, and in view of downsizing and weight saving, it can be set to be 4 mm or less, or 2 mm or less.

An outer diameter (diameter) D4 of the magnet 4 can be 5 to 20 mm.

As shown in FIG. 1, the N-pole and the S-pole of the magnet 4 are separated from each other in a direction perpendicular to the axis C which is the center axis. Namely, an orientation of magnetization of the magnet 4 is in the orthogonal direction relative to the axis C which is the center axis of the circular cylinder. Here, a direction parallel to the axis C of the magnet retainer 2 and the magnet 4 is set to be the Z-direction, a direction of the orientation of magnetization is set to be the X-direction, and a direction perpendicular to the Z-direction and the X-direction is called the Y-direction.

The magnet is a permanent magnet and contains much magnetic powder. Examples of the magnetic powder include hard magnetic powder such as rare earth magnet powder and ferrite magnet powder. In view of downsizing, the magnetic powder is preferably the rare earth magnet powder. The rare earth magnet powder is alloy powder containing rare earth elements.

The rare earth elements contain one or more kinds of elements selected from the group consisting of scandium (Sc) and yttrium (Y) and lanthanides, which belong to the group 3 in the long form periodic table. Here, the lanthanides include lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu).

Among these, it is preferable that the rare earth elements contain neodymium.

Examples of a transition element include Fe, Co, Cu and Zr, and it is preferable to make Fe essential.

Specific examples of rare earth alloy include SmCo-based alloy, NdFeB-based alloy and SmFeN-based alloy. Among these, NdFeB-based alloy expressed as $Nd_2Fe_{14}B$ is preferable. The NdFeB-based alloy contains Nd, Fe and boron. The rare earth magnet can contain other additional elements.

An average particle diameter for the magnetic powder can be, for example, 30 to 250 μm. The magnet 4 may solely contain one kind of magnet powder or may contain two or more kinds of magnet powder.

Figure 3A:
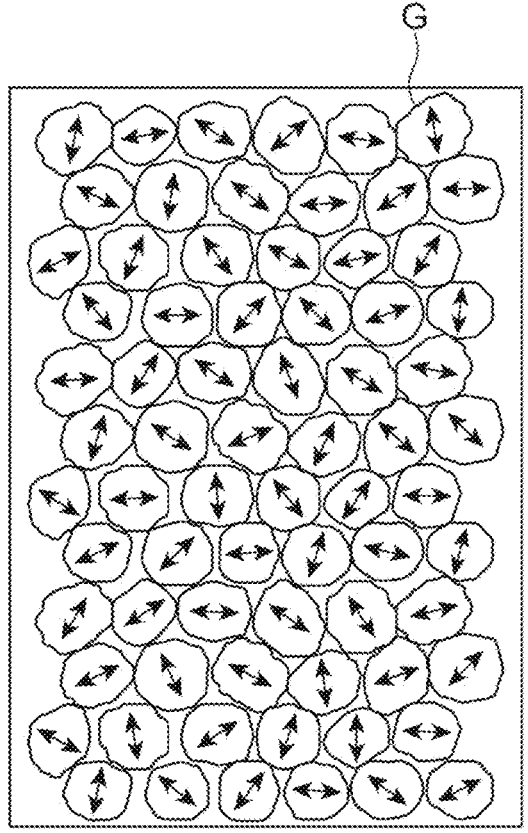
FIG. 3A is a schematic diagram showing a case where axes of easy magnetization of magnetic crystal grains in a magnet are isotropic.

Each magnetic powder has one or a plurality of magnetic crystal grains depending on the particle diameter, and each magnetic crystal grain has an axis of easy magnetization. For example, when a magnetic crystal is $Nd_2Fe_{14}B$, its axis of easy magnetization is the c-axis. FIG. 3A is a schematic diagram showing magnetic crystal grains G and their respective axes of easy magnetization in a cross section of the magnet 4. In the present embodiment, orientations of the axes of easy magnetization of many magnetic crystal grains G existing in the magnet 4 are isotropic, that is, at random.

Such a magnet can be obtained by applying a magnetic field to the magnet to magnetize the magnet after molding without substantially applying a magnetic field thereto in the molding of the magnet 4.

The magnet 4 may be a so-called bonded magnet which contains a binder other than the magnetic powder. An example of the binder is a resin binder.

An example of the resin binder is a hardened material from a thermosetting resin, or a thermoplastic resin. Examples of the thermosetting resin include epoxy resin and phenol resin. Examples of the thermoplastic resin include: polyamides such as nylons (for example, PA12, PA6 and PA66); and polyphenylene sulfides. The magnet 4 may solely contain one kind of resin or may contain two or more kinds of resin.

When the magnet 4 is the bonded magnet, a volume ratio of the resin in the magnet can be 30% to 90%, and a volume ratio of the magnetic powder therein be 10% to 70%.

Returning to FIG. 1 and FIG. 2, the magnet retainer 2 has a shape of a circular tube type in which one end 2d and the other end 2e are open and which has a penetrating hollow portion thereinside, and the magnet 4 is fixed inside the hollow portion.

A flange part 2f extending outward in the radial direction is provided on the one end 2d side of the magnet retainer 2. The shape of the flange part 2f is an annular shape along the outer circumferential face of the magnet retainer 2. The magnet retainer may have no flange part 2f.

The magnet retainer 2 can be manufactured by press processing for forming the flange part 2f, the internal space and the like.

A height H2 of the magnet retainer 2 (the length thereof in the direction of the axis C which is the center axis) can be, for example, 3 to 25 mm, or 5 to 20 mm. An outer diameter D2 of the magnet retainer 2 can be, for example, 3 to 25 mm, or 5 to 20 mm. The thickness of the magnet retainer 2 can be, for example, 0.3 to 3 mm, or 0.5 to 2 mm. The outer diameter of the magnet retainer 2 including the flange part 2f can be, for example, 3 to 30 mm, or 5 to 25 mm.

As shown in FIG. 2, the magnet 4 occupies the inside of the magnet retainer 2 on the one end 2d side, and the magnet 4 is in contact with a portion of an inner circumferential face 2 is of the magnet retainer 2 on the one end 2d side.

The magnet 4 and the magnet retainer 2 may be fixed to each other with an adhesive. For example, the magnet 4 which is obtained by molding (compressive molding, extrusion molding or the like) outside the magnet retainer 2, or obtained by cutting-out from a magnet source material can be fixed to the inside of the magnet retainer 2 with an adhesive or the like.

Moreover, when the magnet 4 is a bonded magnet, adhesiveness of the resin in the bonded magnet can fix the magnet 4 to the magnet retainer. For example, injection molding can integrally form the magnet 4 in the magnet retainer 2. Specifically, fluidization of a raw material composition containing a binder resin and a magnet powder by heating or the like, injection thereof into the magnet retainer, and solidification thereof by cooling or the like can form the magnet 4 in a circular cylinder shape inside the magnet retainer 2. The step of the injection without a magnetic field can isotropically orient the axes of easy magnetization of magnetic crystal grains.

Moreover, although the illustration omitted, the magnet 4 and the magnet retainer 2 may be fixed to each other by providing a projection and a depression in the contact face between the magnet 4 and the magnet retainer 2 and allowing the projection part on one side thereof to fit the depression part on the other side thereof.

In view of the projection and the depression of the magnet 4 not disturbing a magnetic field which the magnet forms, it is preferable that the size of the projection and the depression of the magnet in the radial direction be within ±0.5 mm relative to the outer circumferential face of the magnet 4.

As shown in FIG. 2, while in the aforementioned embodiment, the upper face 4t of the magnet 4 and the one end 2d of the magnet retainer are on the same plane perpendicular to the C-axis, these may have steps to each other in the C-axis direction. An example of the step is 0.05 to 0.5 mm.

It is preferable that the material of the magnet retainer 2 be a non-magnetic material. Examples of the non-magnetic material include aluminum, copper, brass, stainless steel and the like.

Rotational Angle Detector

Subsequently, referring to FIG. 4, an example of a rotational angle detector 20 using the magnet structure 10 of the first embodiment is described. The rotational angle detector 20 includes the magnet structure 10, and a magnetic sensor 12 which detects an orientation of a magnetic field, and measures a rotational angle of rotation R of a steering shaft 14 of a vehicle around the C-axis.

The magnetic sensor 12 is fixed onto the surface (lower face) of a fixing jig F which is not interlocked with rotation of the steering shaft 14. An example of a fixing method of the magnetic sensor 12 is an adhesive.

Examples of the magnetic sensor 12 includes an AMR element, a GMR element and a TMR element. In particular, since the TMR element is high in sensitivity, it is effective for highly accurate measurement of an angle. For example, with a magnetic sensor having two kinds of TMR elements orientations of magnetization of pinned layers of which are perpendicular to each other, a sine signal and a cosine signal are output as distortion-free waveforms along a sine curve in response to an orientation of a magnetic field which the magnet 4 forms, and based on these, the orientation of the magnetic field can be obtained with excellent accuracy.

A distance Gap between the magnet 4 of the magnet structure 10 and the magnetic sensor 12 can be set to be, for example, 1 to 6 mm.

In the case of a magnetic sensor having TMR elements, it is preferable that the position of the magnetic sensor 12 be a position at which the intensity of a magnetic field is 20 to 80 mT.

For example, the steering shaft 14 of a vehicle is inserted into the magnet retainer 2 of the magnet structure 10, and can be fixed to the magnet structure 10. A motor M for electric power steering (EPS) can be connected to the steering shaft 14. By the rotational angle detector 20 detecting the rotational angle of the magnet structure 10, the rotational angle of the steering shaft 14 can be detected with excellent accuracy, and accuracy of electric power steering can be improved.

Figure 4:
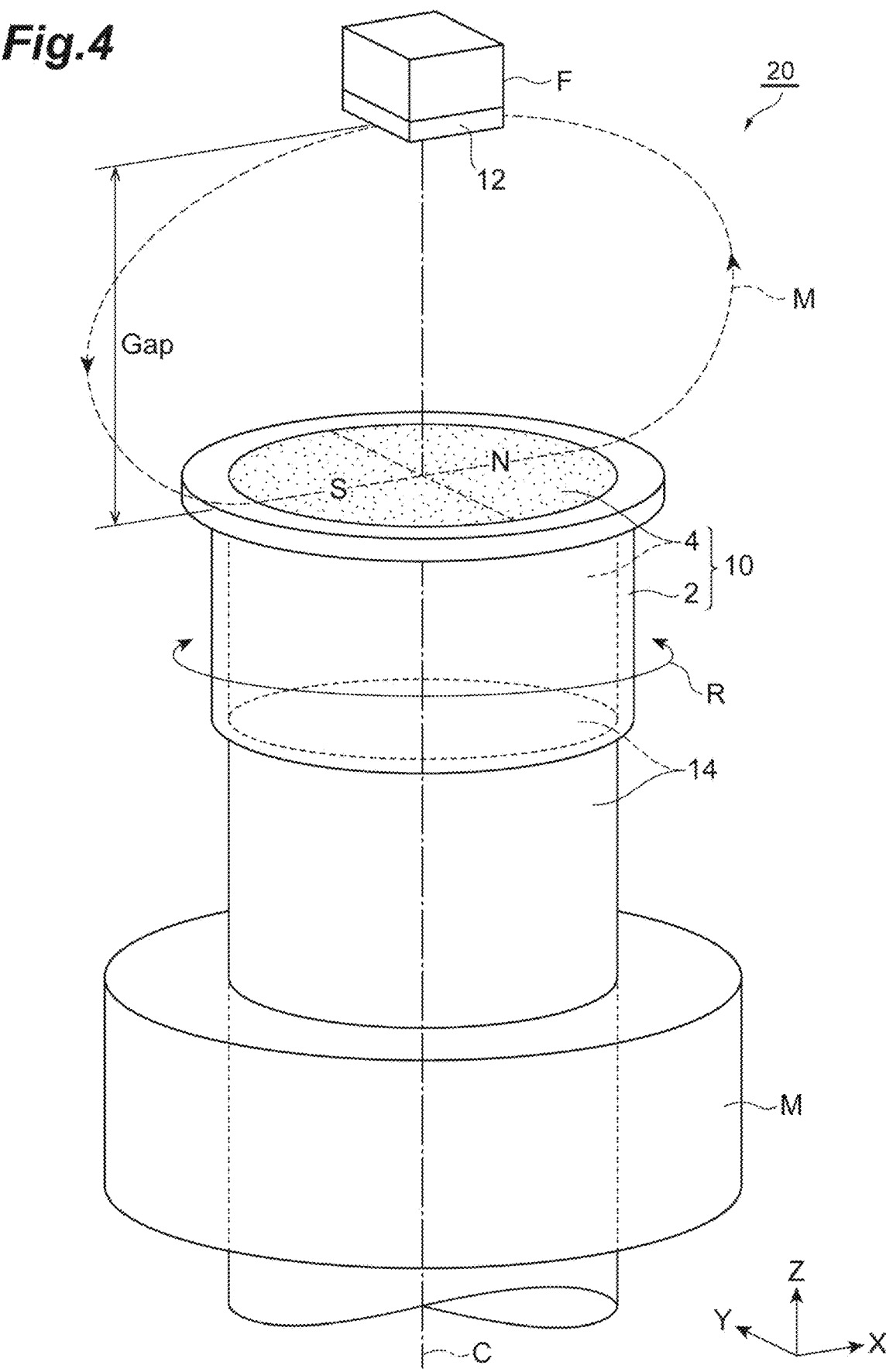
FIG. 4 is a perspective view of a rotational angle detector using the magnet structure according to the first embodiment.

With the magnet structure 10 according to the present embodiment, a magnetic field as indicated by M in FIG. 4 arises by means of the magnet 4, and when rotating the steering shaft 14 around the axis C in the R-direction, the orientation of the magnetic field rotates around the C-axis and changes on the relevant axis C in response to the rotational angle of the steering shaft 14. Further, since the magnet 4 has the circular cylinder shape and the orientation of magnetization thereof is in a direction perpendicular to the axis C of the circular cylinder, even when the position of the magnetic sensor 12 is slightly displaced in the XY-plane from the C-axis, the magnitude and the orientation of the magnetic field which the magnetic sensor 12 receives do not change very much as compared with the case of being on the C-axis. Accordingly, even when a little error arises on an attachment position of the magnetic sensor 12 in a direction going apart from the C-axis, highly accurate angle measurement is possible.

Furthermore, with the magnet 4 according to the present embodiment, since directions of axes of easy magnetization of magnetic crystal grains G in the magnet 4 are isotropic, accuracy of angle detection can be more enhanced as compared with a magnet in which directions of axes of easy magnetization are anisotropic.

Figure 3B:
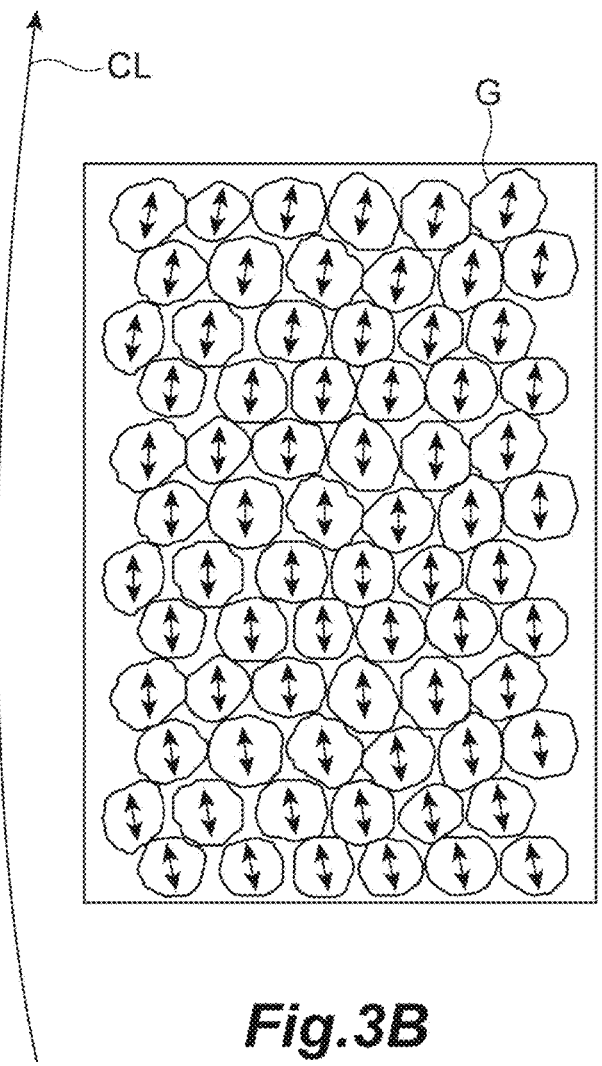
FIG. 3B is a schematic diagram showing a case where axes of easy magnetization of magnetic crystal grains in a magnet are anisotropic.

Specifically, with a magnet in which directions of axes of easy magnetization of magnetic crystal grains are not isotropic but have anisotropy, as shown in FIG. 3B, there can be a case where the axes of easy magnetization are arranged along a curved line. For example, when a magnet receives a magnetic field at a place little separated from the center axis of a coil for magnetic field generation in molding the magnet in the magnetic field, since a line of magnetic force CL becomes a curved line, the axes of easy magnetization of the magnetic crystal grains G in the obtained magnet are arranged along the line of magnetic force CL which is the relevant curved line. Then, even when performing magnetization with respect to such a magnet in any manner afterward, the directions of the axes of easy magnetization do not change, and hence, the orientation of magnetization of the magnet bends along the curved line on which the axes of easy magnetization which the magnet has line up.

On the contrary, when as shown in FIG. 3A, the directions of the axes of easy magnetization of the magnetic crystal grains G are isotropic, that is, at random, the orientation of magnetization of the magnet can be controlled along the magnetic field with excellent accuracy in response to linearity of the magnetic field during magnetization. Furthermore, even when failure of magnetization arises, correction to the correct orientation of magnetization can also be performed by re-magnetization. Accordingly, a yield of magnets that can perform highly accurate angle detection is improved.

As shown in FIG. 1, in the present embodiment, the magnet 4 can afford a region A having a magnetic flux density around a point P1 of intersection of the axis C, the magnetic flux density falling within a range of ±2% relative to a magnetic flux density at the point P1 of intersection of the axis C, in one plane P (see FIG. 1) perpendicular to the axis C, and a radius of an inscribed circle of the region A can be 0.5 mm or more.

Moreover, in the aforementioned embodiment, the magnet 4 can afford a region B having an orientation of an in-plane magnetic field around the point P1 of intersection of the axis C, an inclination of the orientation relative to an orientation of an in-plane magnetic field at the point P1 of intersection of the axis C falling within a range of ±0.6°, in the one plane P perpendicular to the axis C, and a radius of an inscribed circle of the region B can be 0.5 mm or more.

With the magnet 4 and the magnet structure 10 having such characteristics, by disposing the magnetic sensor 12 measuring an orientation of a magnetic field at the relevant point P1 on the plane P, angle detection is possible with excellent accuracy. In particular, although the attachment position of the magnetic sensor tends to be separated in the XY-plane from the axis C, according to the present embodiment, even when the position of the magnetic sensor 12 is separated in the XY-plane from the axis C to some extent, accuracy is preferably maintained to be high.

For example, there are many cases where installation accuracy of the magnetic sensor 12 in the XY-plane falls at approximately ±0.5 mm, and detection accuracy is to be able to be maintained high even when the position is displaced as above.

Moreover, when a configuration of the magnet has a diameter of 13 mm or more and a height of 2 mm or more, the aforementioned radii of the inscribed circles of the regions A and B can be 1.8 mm or more. For example, there is also a case of using a sensor unit which has two dependent magnetic sensors for securing redundancy and in which the distance between the two magnetic sensors is separated by approximately 2.6 mm. In this case, while the sensor unit is disposed on the fixing jig F in such a way that the center between the two magnetic sensors is disposed on the C-axis, when the regions A and B are wide as above, accuracy of angle detection can be made high even when installation accuracy of the sensor unit in the XY-plane falls at approximately ±0.5 mm.

The distance Gap of the plane P from the magnet 4 which distance can realize the relevant regions A and B can be 1 to 3 mm.

Second Embodiment

Figure 5:
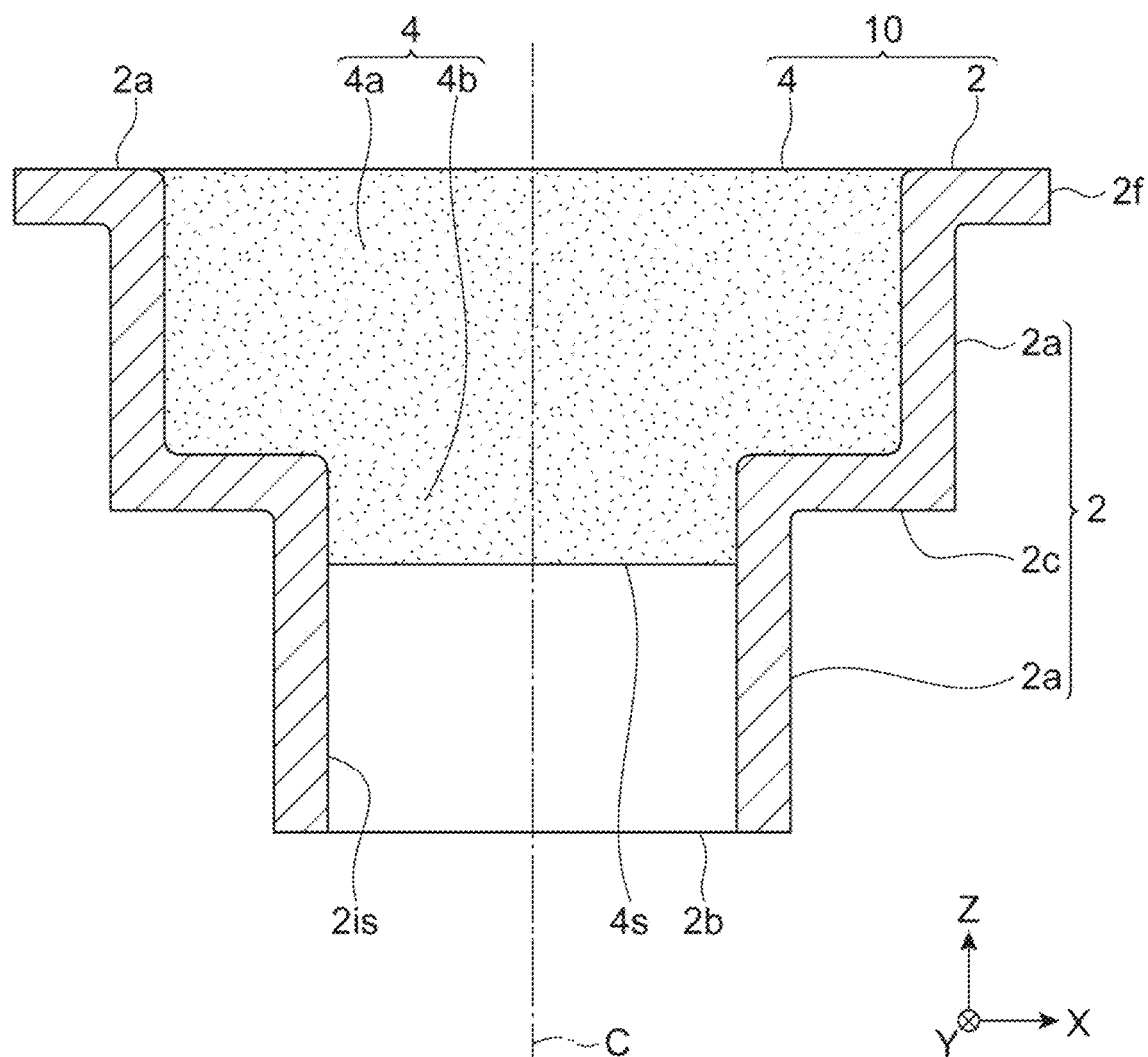
FIG. 5 is a cross-sectional view of a magnet structure according to a second embodiment along the axis C.

FIG. 5 is a cross-sectional view including an axis of the magnet 4 and the magnet structure 10 according to a second embodiment of the present invention. The first point in which the second embodiment is different from the first embodiment is a point that the magnet retainer 2 is a circular tube having a narrow tube part 2a, a wide tube part 2b and a diameter enlargement part 2c, and the outer diameter and the inner diameter of the magnet retainer 2 change along the axial direction. Moreover, the second point is a point that, accordingly to this, the magnet 4 has a large diameter part 4a and a small diameter part 4b, and the shape of the magnet 4 is a circular cylinder in which the outer diameter changes along the axial direction.

The diameter of the small diameter part 4b of the magnet can be set to be similar to that for the first embodiment. The diameter of the large diameter part 4a of the magnet can be set to be 5 to 20 mm.

The present embodiment also achieves effects and operation similar to those for the first embodiment.

Third Embodiment

Figure 6:
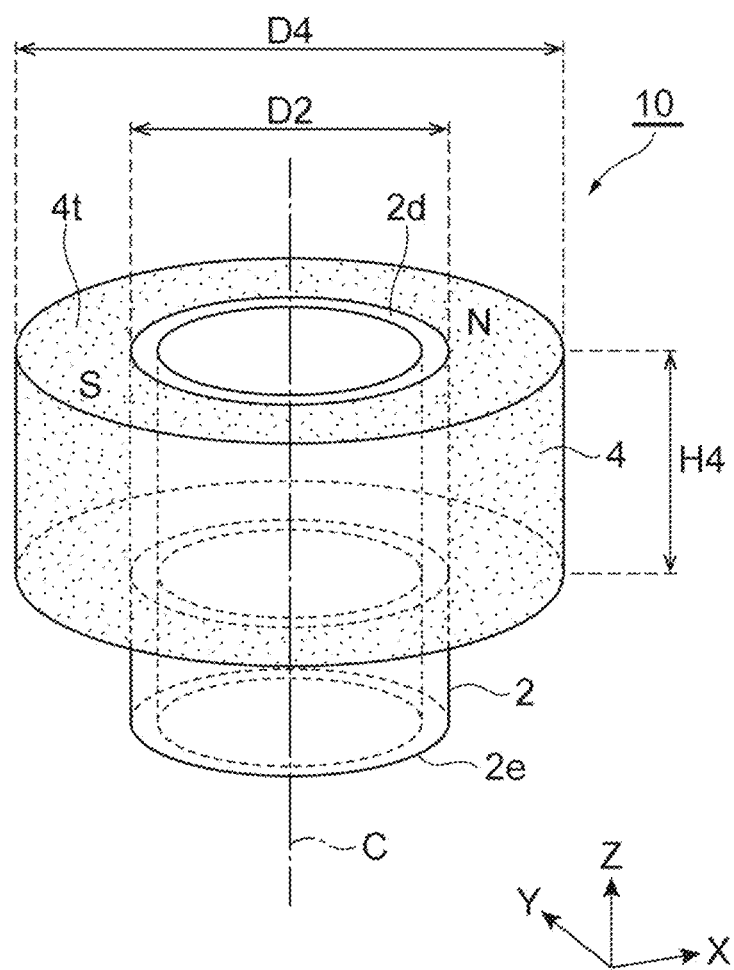
FIG. 6 is a perspective view of a magnet structure according to a third embodiment.

FIG. 6 is a cross-sectional view including the axis C which is the center axis of the magnet structure 10 according to a third embodiment of the present invention.

The point in which the present embodiment is different from the first embodiment is a point that the shape of the magnet 4 is a circular tube, not a circular cylinder, and the magnet 4 is provided on the outer circumferential face of the magnet retainer 2, not inside the same.

The thickness H4 of the magnet 4 in the Z-direction can be set to be similar to that for the first embodiment. The inner diameter D2 of the magnet 4 (the outer diameter D2 of the magnet retainer 2) can be set to be 4 to 10 mm. The outer diameter D4 of the magnet 4 can be set to be 10 to 50 mm.

The thickness of the magnet retainer 2 can be set to be similar to that for the first embodiment.

While also in the present embodiment, the upper face 4t of the magnet 4 and the one end 2d of the magnet retainer 2 are on the same plane perpendicular to the C-axis, these may have steps to each other in the C-axis direction. An example of the step is 0.05 to 0.5 mm.

Moreover, the illustration omitted, a projection and a depression can also be provided in the contact face between the magnet 4 and the magnet retainer 2 as described for the first embodiment. Thereby, fixation of the magnet 4 and the magnet retainer 2 to each other can be more secured.

While in the present embodiment, the magnet retainer 2 does not have a flange part, it may have the flange part.

Examples of a method for lung the magnet 4 on an outer circumferential face 2p of the magnet retainer 2 include injection molding, and adhesion with an adhesive similarly to the first embodiment. The present embodiment also achieves effects and operation similar to those for the first embodiment.

The present invention is not limited to the aforementioned embodiments but can be embodied as various modifications.

Other Modes

The mode of the magnet may be a shape other than the shapes in the aforementioned embodiments as long as it is a circular cylinder or a circular tube. For example, the outer diameter of the circular cylinder or the circular tube of the magnet may change along the axial direction as in the second embodiment (see FIG. 5). For example, as a manner of the change, other than a stepped shape in which the outer diameter changes step-like in the middle in the axial direction as in FIG. 5, there are a shape having, in the middle, a tapered part whose outer diameter changes taper-like in the middle in the axial direction, and a tapered shape whose outer diameter changes over its entirety in the axial direction.

Also when the magnet is a circular tube as in the third embodiment (see FIG. 6), the outer diameter of the magnet may change along the axial direction, the inner diameter of the magnet may change along the axial direction, or the outer diameter and the inner diameter of the magnet may change along the axial direction.

The shape of the magnet retainer is not limited to a circular tube but may be a polygonal tube as long as it has a shape which can retain the magnet. Moreover, when the magnet is a circular tube as in the third embodiment, the magnet retainer may be a circular cylinder. Furthermore, while in the aforementioned embodiments, the other end (one end) 2e of the magnet retainer 2 is opened with connection to a rotary shaft such as a steering shaft taken into consideration, the other end of the magnet retainer 2 may be closed. The magnet retainer 2 can further include a connection structure which can fix a rotary shaft such as a steering wheel shaft of a vehicle thereto. Examples of the connection structure include a depression receiving part.

Examples and Calculation Examples

Figure 7A:
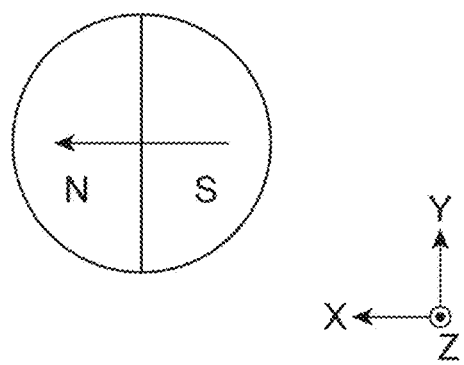
FIG. 7A is a top view showing a shape and an orientation of magnetization of a circular cylinder magnet (magnet A) in simulation and an experiment.
Figure 7B:
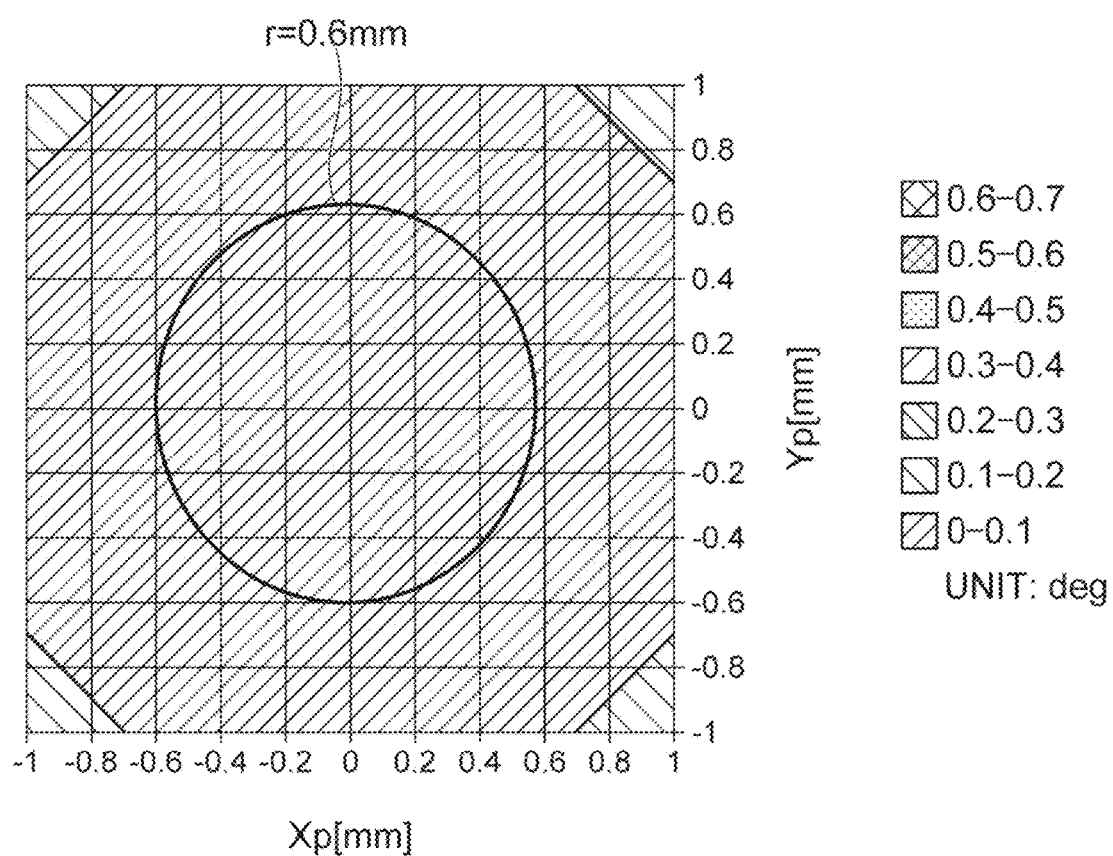
FIG. 7B is a diagram showing magnitudes of inclinations relative to an orientation of an in-plane magnetic field at a point P1 of intersection of the axis C, at points on a plane P where a distance Gap from an upper face (end face) of the magnet in FIG. 7A in the C-axis direction is separated by 2 mm.
Figure 8A:
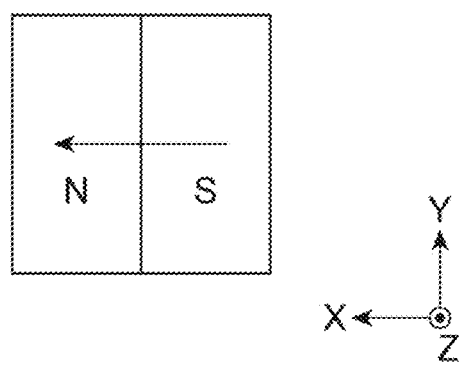
FIG. 8A is a top view showing a shape and an orientation of magnetization of a square prism magnet (magnet B) in simulation and an experiment.
Figure 8B:
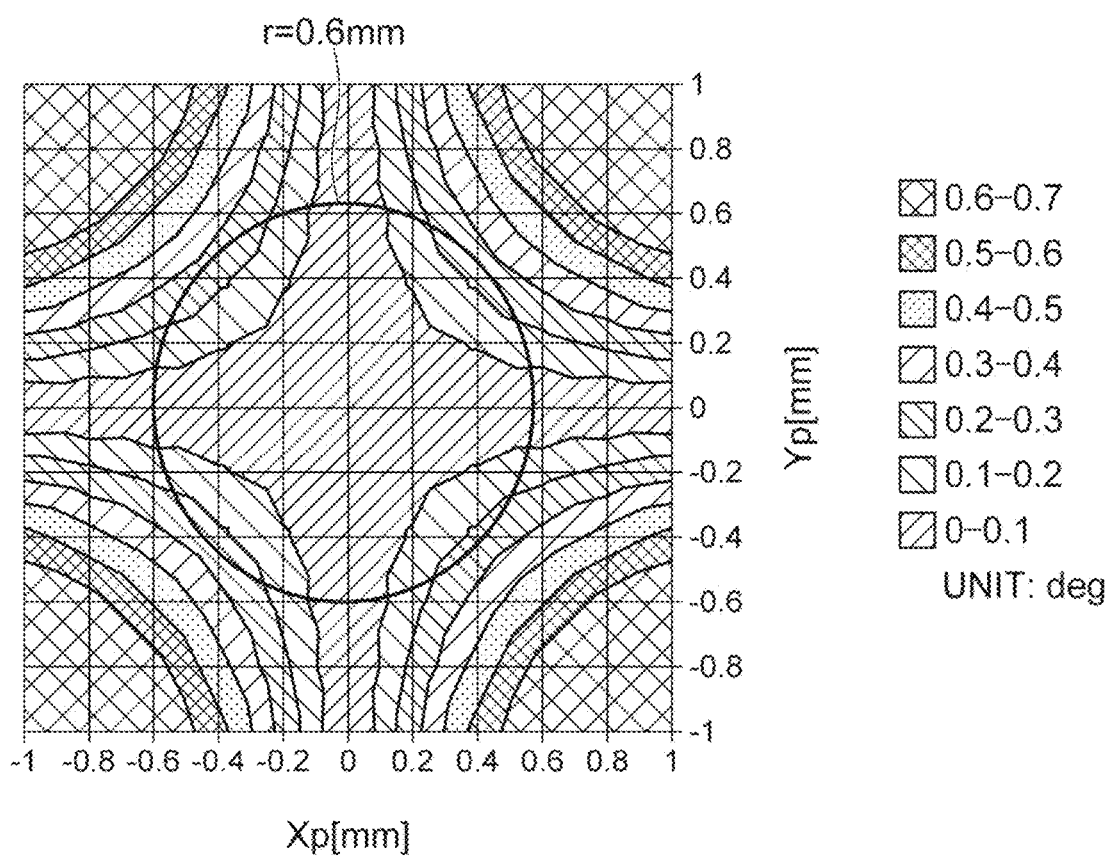
FIG. 8B is a diagram showing magnitudes of inclinations relative to an orientation of an in-plane magnetic field at the point P1 of intersection of the axis C, at points on the plane P where the distance Gap from the upper face (end face) of the magnet in FIG. 8A in the C-axis direction is separated by 2 mm.

Regarding a bonded magnet comprising $Nd_2Fe_{14}B$ magnet powder and nylon PA12, FIG. 7B and FIG. 8B show magnitudes of inclinations of in-plane magnetic field orientations relative to the orientation of an in-plane magnetic field at the point P1 of intersection of the axis C, at points on the plane P where the distance Gap from the upper face (end face) of the magnet in the C-axis direction is separated by 2 mm, in a case where the magnet (called a magnet A) has a circular cylinder shape and its orientation of magnetization is perpendicular (X-direction) to the axis (Z-axis) of the cylinder as in FIG. 7A, and in a case where the magnet (called a magnet B) has a square prism shape and its orientation of magnetization is perpendicular to the axis (Z-axis) of the prism and is oriented from one side thereof toward the opposite side as in FIG. 8A, respectively. Notably, the diameter (XY-plane) of the magnet in the circular cylinder shape in FIG. 7A is 13 mm, and the thickness (Z-direction) thereof is 2 mm. Moreover, the lengths of the sides (X-direction; Y-direction) of the magnet of the square prism shape in FIG. 8A are 11.5 mm, and the thickness (Z-direction) thereof is 2 mm. The magnitudes of the inclinations of the magnetic field were calculated through simulation.

As shown in FIG. 7B and FIG. 8B, when the magnet has the circular cylinder shape, a region in which an angle error is 0.1° or less is wide, and a margin of attachment accuracy of the magnetic sensor increases.

In FIG. 7B, the radius of the inscribed circle of the region in which the inclination of the angle falls within a range of ±0.6° was 2.4 mm, and in FIG. 8B, it was 0.8 mm. Moreover, while in FIG. 7B, an average of angle errors on the circumference on which the distance from the C-axis is 1.2 mm was 0.003°, in FIG. 8B, it was 0.25°.

Figure 9:
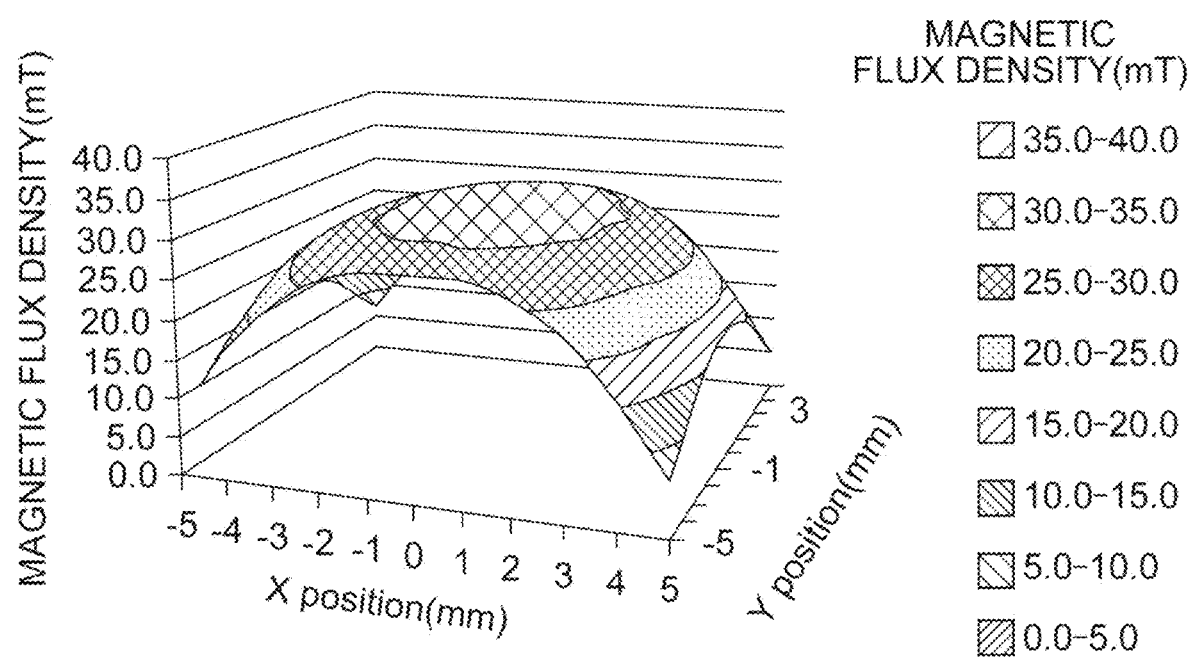
FIG. 9 is a diagram showing a distribution of magnetic flux densities which were obtained by actual measurement at points on the plane P where the distance Gap from the upper face (end face) of the magnet A in FIG. 7A in the C-axis direction was separated by 2 mm.

FIG. 9 shows results which were obtained by actually measuring a magnetic flux density distribution on the plane P where the distance Gap from the upper face (end face) of the magnet in the C-axis direction was separated by 2 mm regarding the aforementioned magnet A having the circular cylinder shape and consisting of $Nd_2Fe_{14}B$ magnet powder and nylon PA12.

It is understood that a region in which the magnetic flux density is constant widely spreads around the point of intersection of the axis C. The magnitude of the radius of the inscribed circle of the region having the magnetic flux density which fell within a range of ±2% relative to the magnetic flux density at the point of intersection of the axis C was 3 mm.

Figure 10:
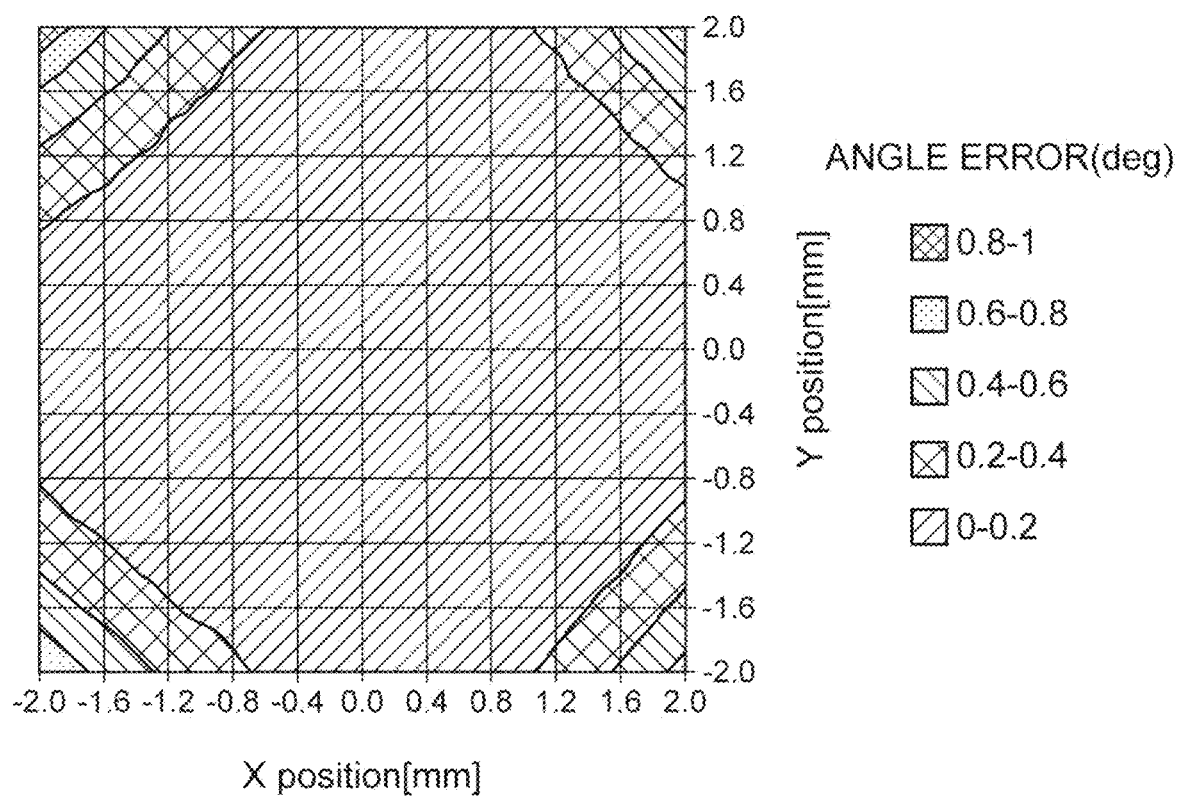
FIG. 10 is a diagram showing a distribution of actual measurement values of the inclinations relative to the orientation of the in-plane magnetic field at the point of intersection of the C-axis, at points on the plane P where the distance Gap from the upper face (end face) of the magnet in the C-axis direction is separated by 2 mm, regarding the magnet A in FIG. 7A.

Furthermore, FIG. 10 shows actual measurement values of the inclinations relative to the orientation of the in-plane magnetic field at the point of intersection of the C-axis, at points on the plane P where the distance Gap from the upper face (end face) of the magnet in the C-axis direction is separated by 2 mm, regarding the aforementioned magnet A which has the circular cylinder shape and consists of $Nd_2Fe_{14}B$ magnet powder and nylon PA12.

It is understood that there is tendency similar to that in the simulation results. When there was defined a region having an orientation of an in-plane magnetic field, an inclination of the orientation falling within a range of ±0.6° relative to an orientation of an in-plane magnetic field at a point of intersection of the axis C, the radius of the inscribed circle of the region was 2.8 mm.

Figure 11:
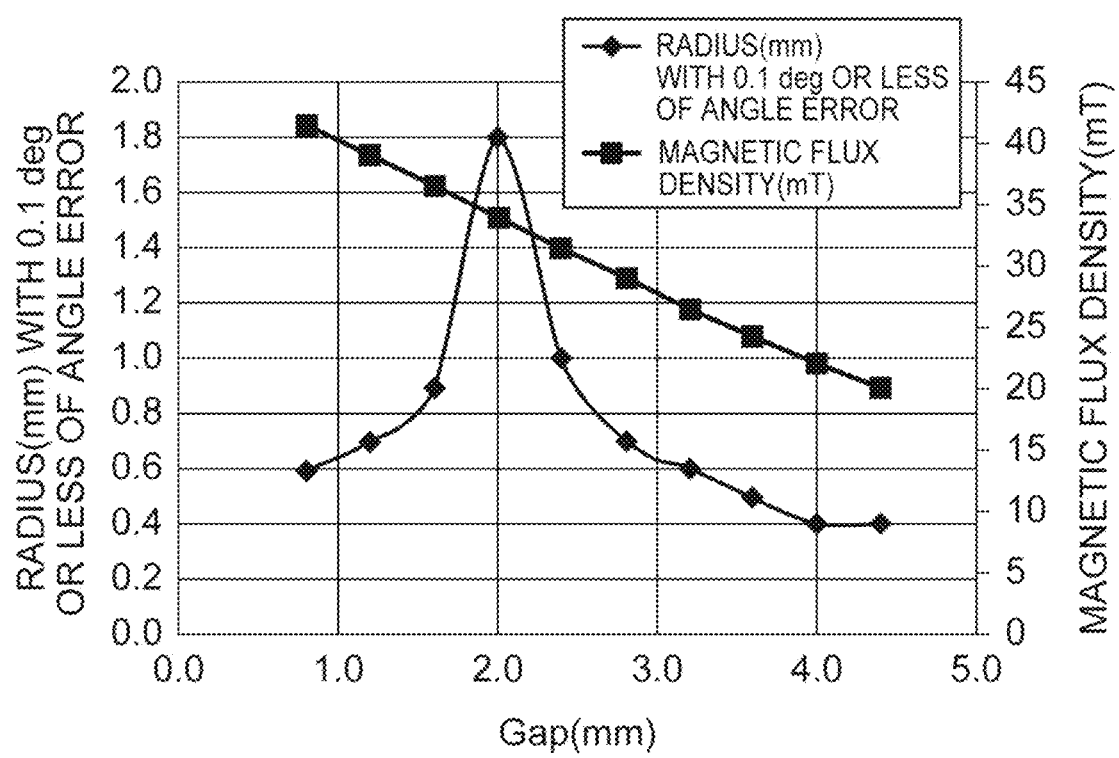
FIG. 11 is a graph presenting a radius of an inscribed circle of a region with respect to the distance Gap, the region having an orientation of an in-plane magnetic field in which an inclination of the orientation relative to an orientation of an in-plane magnetic field at the point of intersection of the axis C falls within a range of ±0.1°, and change in magnetic flux density on the C-axis, regarding the magnet A in FIG. 7A.

Furthermore, FIG. 11 is a graph presenting the radius of the inscribed circle of a region with respect to the distance Gap by obtaining the region having an orientation of an in-plane magnetic field in which an inclination of the orientation relative to an orientation of an in-plane magnetic field at a point of intersection of the axis C falls within a range of ±0.1°, on each plane perpendicular to the axis C while changing the distance Gap on the C-axis, in the aforementioned magnet A having the circular cylinder shape and consisting of $Nd_2Fe_{14}B$ magnet powder and nylon PA12. Furthermore, FIG. 11 also shows change in magnetic flux density in the case of changing the distance Gap on the C-axis.

This magnet showed characteristics that there came up extremely many regions in which angle errors were small at a fixed distance Gap (2.0 mm).

This magnet had 615 mT of residual magnetic flux density, 410 kA/m of coercive force Hcb, 748 kA/m of coercive force Hcj, and 63 kJ/m$^3$ of maximum energy product BHmax.

Figure 12A:
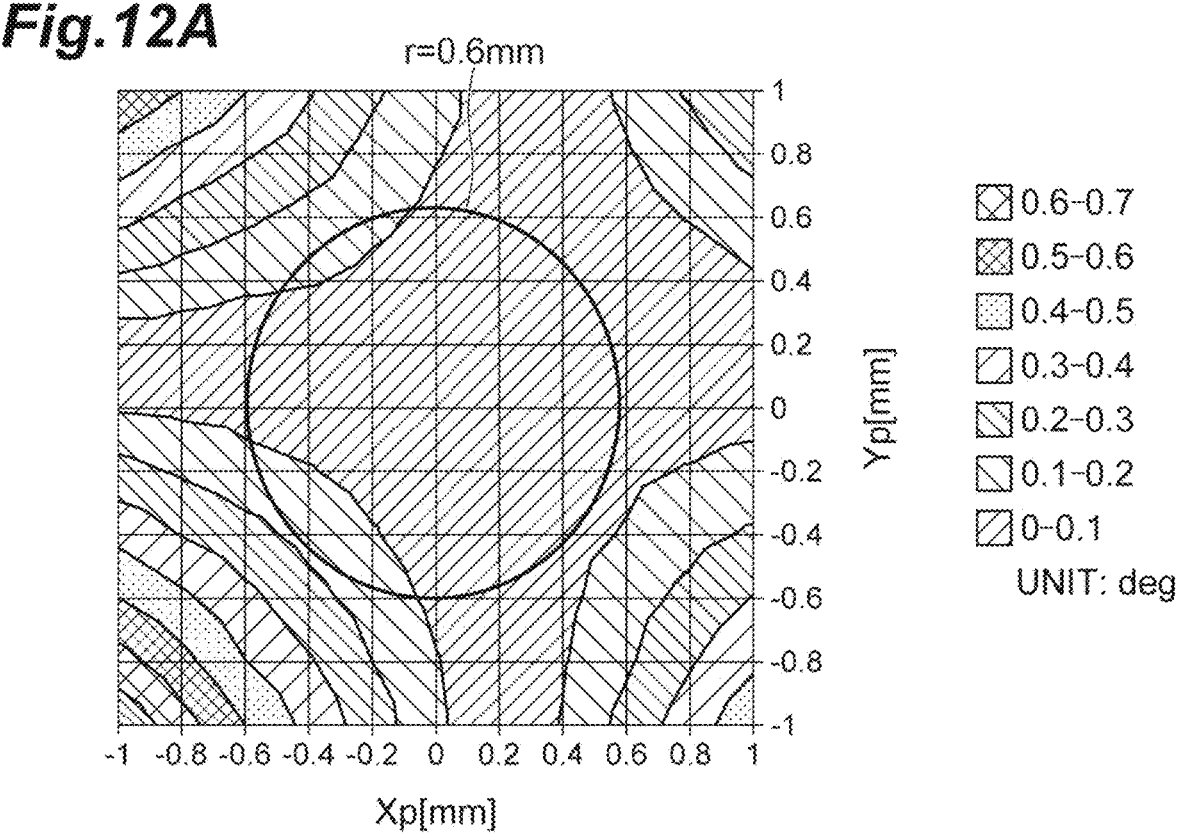
FIG. 12A is a diagram of actual measurement values of inclinations relative to an orientation of an in-plane magnetic field at the point of intersection of the C-axis, at points on the plane P where the distance Gap from the upper face (end face) of the magnet in the C-axis direction is separated by 2 mm, regarding a magnet C in the same shape as that of the magnet A other than being an anisotropic ferrite magnet.
Figure 12B:
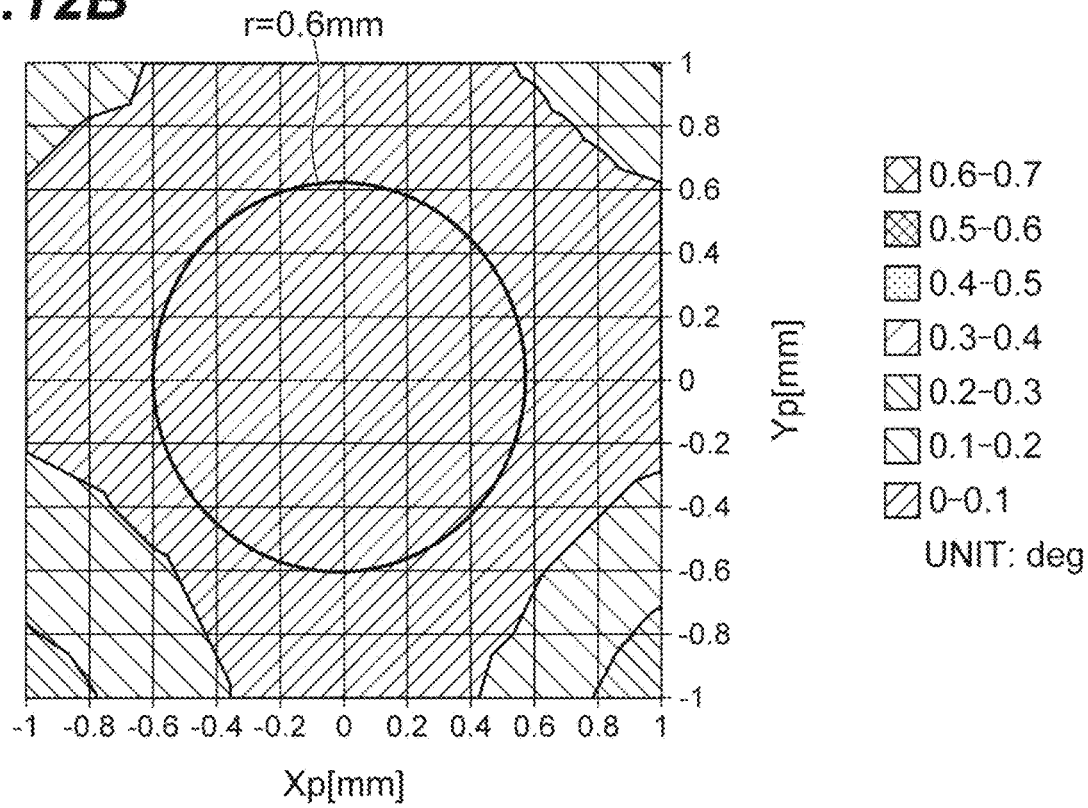
FIG. 12B is a diagram of actual measurement values regarding the magnet A to be compared.

FIG. 12A is a graph of actual measurement values of inclinations of in-plane magnetic field orientations relative to an orientation of an in-plane magnetic field at a point of intersection of the C-axis, at points on the plane P where the distance Gap from the upper face (end face) of the magnet in the C-axis direction was separated by 2 mm, regarding a magnet C in the same shape as that of the magnet A other than being a ferrite magnet in which axes of easy magnetization were anisotropically arranged. FIG. 12B is a graph of actual measurement values regarding the magnet A to be compared. The magnet A is wider in region where the angle error is small.

What is claimed is:
1. A magnet structure comprising:
a magnet having a circular cylinder or circular tube shape and containing magnetic crystal grains, wherein an orientation of magnetization of the magnet is in a direction perpendicular to an axis of the circular cylinder or the circular tube, and directions of axes of easy magnetization of the magnetic crystal grains are isotropic, wherein one plane perpendicular to the axis has a region having a magnetic flux density around a point of intersection of the axis, the magnetic flux density falling within a range of ±2% relative to a magnetic flux density at the point of intersection of the axis, and a radius of an inscribed circle of the region is 0.5 mm or more; and
a magnet retainer retaining the magnet, wherein one end of the magnet retainer is open and one end face of the magnet is exposed to outside of the retainer through the one end of the magnet retainer.
2. The magnet structure according to claim 1, the magnet further containing a resin.

3. The magnet structure according to claim 1, wherein one plane perpendicular to the axis has a region having an orientation of an in-plane magnetic field around a point of intersection of the axis, an inclination of the orientation falling within a range of ±0.6° relative to an orientation of an in-plane magnetic field at the point of intersection of the axis, and a radius of an inscribed circle of the region is 0.5 mm or more.

4. The magnet structure according to claim 1, wherein the magnetic crystal grains contain a rare earth element, a transition element, and boron.

5. A rotational angle detector comprising: the magnet structure according to claim 1; and a magnetic sensor detecting an orientation of a magnetic field.

\* \* \* \* \*